United States Patent
Chang et al.

(10) Patent No.: US 9,435,648 B2
(45) Date of Patent: Sep. 6, 2016

(54) MAP MATCHING DEVICE, SYSTEM AND METHOD

(71) Applicant: INDUSTRIAL TECHNOLOGY RESEARCH INSTITUTE, Hsinchu (TW)

(72) Inventors: Chin-Chia Chang, Tainan (TW); Shih-Ching Huang, Kaohsiung (TW); Chia-Ming Tsai, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 214 days.

(21) Appl. No.: 13/925,722

(22) Filed: Jun. 24, 2013

(65) Prior Publication Data

US 2014/0172293 A1 Jun. 19, 2014

(30) Foreign Application Priority Data

Dec. 17, 2012 (TW) .............................. 101147735 A

(51) Int. Cl.
*G01C 21/00* (2006.01)
*G01C 21/20* (2006.01)
*G01C 21/16* (2006.01)

(52) U.S. Cl.
CPC ........... *G01C 21/005* (2013.01); *G01C 21/165* (2013.01); *G01C 21/206* (2013.01)

(58) Field of Classification Search
None
See application file for complete search history.

(56) References Cited

U.S. PATENT DOCUMENTS

| | | | |
|---|---|---|---|
| 5,774,824 A | 6/1998 | Streit et al. | |
| 6,622,085 B1* | 9/2003 | Amita et al. | 340/995.14 |
| 6,915,205 B2 | 7/2005 | Kim et al. | |
| 7,363,147 B2 | 4/2008 | Esaki et al. | |
| 7,418,364 B1 | 8/2008 | Horton et al. | |
| 7,756,639 B2* | 7/2010 | Colley et al. | 701/446 |
| 7,995,801 B2 | 8/2011 | Kourogi et al. | |
| 8,195,386 B2 | 6/2012 | Hu et al. | |
| 8,214,149 B2 | 7/2012 | Lee et al. | |
| 2002/0065603 A1* | 5/2002 | Watanabe et al. | 701/207 |
| 2002/0193940 A1* | 12/2002 | Hashida | 701/207 |
| 2008/0033645 A1* | 2/2008 | Levinson | G01C 15/00 701/469 |
| 2009/0043504 A1* | 2/2009 | Bandyopadhyay et al. | 701/213 |

(Continued)

FOREIGN PATENT DOCUMENTS

| | | |
|---|---|---|
| TW | 200900655 | 1/2009 |
| TW | 200921050 | 5/2009 |

(Continued)

OTHER PUBLICATIONS

Taiwan Patent Office, Office Action, Patent Application Serial No. 101147735, Aug. 4, 2014, Taiwan.

(Continued)

*Primary Examiner* — John R Olszewski
*Assistant Examiner* — Nicholas K Wiltey

(57) ABSTRACT

A map matching device for a positioning device includes an inertial detect module, measuring a moving signal generated from the positioning device, a movement estimation module, estimating location information of the positioning device according to the moving signal, a map data storage module, storing a plurality of types of map feature information of an environment where the positioning device is located, and a matching module, matching the location information with the plurality of types of map feature information for performing map matching processes, and providing a positioning coordinate.

21 Claims, 5 Drawing Sheets

(56) References Cited

U.S. PATENT DOCUMENTS

2009/0102707 A1* 4/2009 Elwell, Jr. ............ G01C 21/206
 342/357.52
2012/0008831 A1* 1/2012 Tanigawa ............ G01B 21/045
 382/103

FOREIGN PATENT DOCUMENTS

| TW | 200949200 | 12/2009 |
|---|---|---|
| TW | 201011257 | 3/2010 |
| TW | 201020519 | 6/2010 |
| TW | 201120414 | 6/2011 |
| TW | I374257 | 10/2012 |

OTHER PUBLICATIONS

Davidson et al., "Application of Particle Filters for Indoor Positioning Using Floor Plans", Ubiquitous Positioning Indoor Navigation and Location Based Service (UPINLBS), Oct. 2010, pp. 1-4, IEEE, US.

Klingbeil et al., "A Modular and Mobile System for Indoor Localization", Indoor Positioning and Indoor Navigation (IPIN), 2010 International Conference, Sep. 2010, pp. 1-10, IEEE, US.

Beauregard et al., "Indoor PDR Performance Enhancement Using Minimal Map Information and Particle Filters", Position, Location and Navigation Symposium, May 2008, pp. 141-147, IEEE, US.

Gillieron et al., "Personal Navigation System for Indoor Applications", Proceedings of the 11th IAIN World Congress, Oct. 2003, pp. 1-15, EPFL, Germany.

Robertson et al., "Simultaneous Localization and Mapping for Pedestrians Using Only Foot-Mounted Inertial Sensors", Ubicomp '09 Proceedings of the 11th international conference on Ubiquitous computing, Oct. 2009, pp. 93-96, ACM, US.

* cited by examiner

MAP MATCHING DEVICE, SYSTEM AND METHOD

CROSS REFERENCE TO RELATED APPLICATIONS

This application claims priority of Taiwan Patent Application No. 101147735, filed on Dec. 17, 2012, the entirety of which is incorporated by reference herein.

BACKGROUND

1. Technical Field

The disclosure is related to map matching, and, more particularly, to application of a plurality of types of map features to map matching.

2. Description of the Related Art

Recently, Global Positioning Systems (GPS) are applied to many kinds of electrical device such as mobile phones or the navigation systems of cars. A GPS receives satellite signals and positions the electrical device which has the GPS receiver according to the relative location for determining the location of the electrical device. Users can also use the navigation program in the electrical device for planning and navigation operations.

Users now commonly require that GPSs not only provide common tracking and navigation for cars but also provide other tracking and navigation services such as pedestrian navigation, bicycle navigation or tracking of valuables. In the outdoors, GPSs may provide the location information of a tracked target accurately, however when GPSs is in an indoor environment or when satellite signals are interfered with and sheltered, such as in a tunnel or under a shed, GPSs may not receive the satellite signals, thus interrupting GPS services. Therefore, navigation apparatuses now use an Inertial Measurement Unit to detect related signals of tracked targets and use the Dead Reckoning method to compensate for the moving information when the signal of a GPS is lost, for tracking the location of the tracked target continuously in a state without the GPS signal.

Nevertheless, indoor automatic positioning technology for pedestrians used to detect a moving signal for estimating a position by an inertial detect device carried by the pedestrian, may generate errors as time goes by because of a drift of the inertial detect device, thus causing the limitation of available usage time and stability of a system.

SUMMARY

An embodiment of the disclosure provides a map matching device for a positioning device including: an inertial detect module, measuring a moving signal generated from the positioning device; a movement estimation module, estimating location information of the positioning device according to the moving signal; a map data storage module, storing a plurality of types of map feature information of an environment where the positioning device is located; and a matching module, matching the location information with the plurality of types of map feature information for performing map matching processes, and providing a positioning coordinate.

An embodiment of the disclosure provides a map matching method, comprising: measuring a moving signal generated from a positioning device by an inertial detect module; estimating location information of the positioning device according to the moving signal by a movement estimation module; storing, by a map data storage module, a plurality of types of map feature information of an environment where the positioning device is located; and matching the location information with the plurality of types of map feature information for performing map matching processes, and providing a positioning coordinate by a matching module.

An embodiment of the disclosure provides a map matching system including a positioning device and a display device, wherein the positioning device comprises: an inertial detect module, measuring a moving signal generated from the positioning device; a movement estimation module, estimating location information of the positioning device according to the moving signal; a map data storage module, storing a plurality of types of map feature information of an environment where the positioning device is located; and a matching module, matching the location information with the plurality of types of map feature information for performing map matching processes, and providing a positioning coordinate.

BRIEF DESCRIPTION OF THE DRAWINGS

The disclosure will become more fully understood by referring to the following detailed description with reference to the accompanying drawings, wherein.

DETAILED DESCRIPTION

Figure 1:
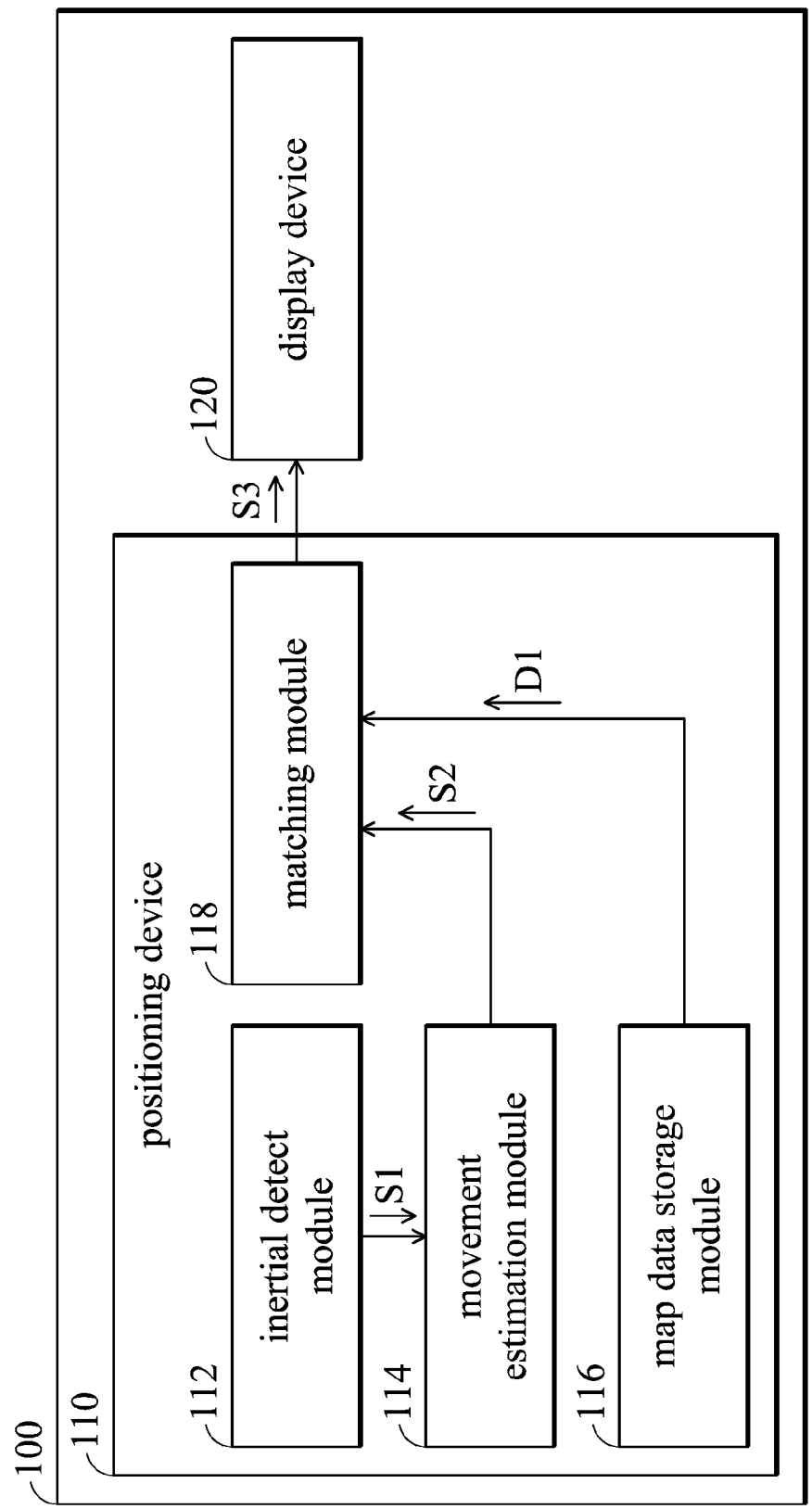
FIG. 1 is a schematic diagram illustrating the map matching system 100 according to an embodiment of the disclosure.

FIG. 1 is a schematic diagram illustrating a map matching system 100 according to an embodiment of the disclosure. In the FIG. 1, the map matching system 100 comprises a positioning device 110 and a display device 120, wherein the positioning device 110 comprises an inertial detect module 112, a movement estimation module 114, a map data storage module 116 and a matching module 118.

In an embodiment of the disclosure, the inertial detect module 112 of the positioning device 110 is configured to measure a moving signal S1 generated from the positioning device 110, wherein the moving signal S1 comprises acceleration and angular velocity generated by the positioning device 110. For example, the positioning device 110 is usually carried by the user, and the inertial detect module 112 uses an Accelerometer Mete and a Gyro to detect the rotation of the positioning device 110 in the x-axis, y-axis, z-axis or the result of the changed direction and location generated by the moving of the positioning device 110 for generating the moving signal S1 when the user moves.

In an embodiment of the disclosure, the movement estimation module 114 is configured to estimate location information S2 of the positioning device 110 according to the moving signal S1. Specifically, the location information S2 has not matched with the plurality of types of map feature information. Therefore, the location information S2 may generate an error as time goes by caused by the drift of the positioning device 110.

In an embodiment of the disclosure, the map data storage module 116 is configured to store a plurality of types of map feature information D1 of an environment where the positioning device 110 is located, wherein the plurality of types of map feature information comprises a plurality of geometry shape information (such as: polygon geometry and line geometry) and coordinate information. In an embodiment of the disclosure, the plurality of types of map feature information may comprise: (1) a room feature type, recorded by the polygon geometry and configured to determine area ranges of enclosed spaces, such as room, conference room, or office; (2) a passage feature type, recorded by the line geometry and configured to determine the entrances/exits between the area ranges of the enclosed spaces and determine matching point coordinates and orientation angles of the entrances/exits, such as the doors of a room or office, a door of an elevator or escape exit; (3) a route feature type, recorded by the line geometry and configured to determine a location of the route and orientation angles of the route in a passable area range, such as aisles of the office, corridors of the classroom and the pedestrian paths of a park; and (4) an obstacle feature type, recorded by the polygon geometry and configured to determine obstacle area ranges of the obstacles, such as tables in a meeting room, a cupboard and a bar counter. According to the above embodiment, the positioning device 110 may classify and set the environment where the user walks in advance for generating a plurality of types of map feature information D1 according to the above types of types of map feature information and store the plurality of types of map feature information D1 in the map data storage module 116. For example, the positioning device 110 may classify and set the environment of every floor in an office building where the user works in advance for generating the plurality of types of map feature information D1 according to the above types of types of map feature information. In addition, the positioning device 110 may classify and set the environment of a school where the user studies in advance for generating the plurality of types of map feature information D1 according to the above types of types of map feature information.

In an embodiment of the disclosure, the matching module 118 is configured to match the location information S2 and the plurality of types of map feature information D1 for performing map matching processes and providing a positioning coordinate S3. In an embodiment of the disclosure, the matching module 118 matches the location information S2 and the plurality of types of map feature information D1 for performing map matching processes by adjusting a weighted value corresponding to the location information S2 according to a matching result generated by comparing the location information S2 with the plurality of types of map feature information D1. In an embodiment of the disclosure, the display device 120 receives the positioning coordinate S3 and displays a location of the positioning device 110.

Specifically in the above embodiment, the matching module 118 progresses a particles initialization process for the location information S2 by a particles filter (not presented) and adds white noise into the location information S2 by a Gaussian distribution method for measuring the distribution of each particle at a next time interval. Then, the matching module 118 measures the weighted value and a related matching process by the plurality of types of map feature information D1. The steps of the matching method are as follows: (1) The estimated coordinate of a particle is analyzed and it is determined whether it is located in the range of the room feature type of the plurality of types of map feature information D1. If the estimated coordinate of the particle is located in the range of the room feature type of the plurality of types of map feature information D1, the original weighted value is maintained to reserve the estimated coordinate of the particle. (2) If the estimated coordinate of the particle is located on the outside of the range of the room feature type of the plurality of types of map feature information D1, the estimated coordinate is further analyzed and it is determined whether it passed the range of the passage feature type of the plurality of types of map feature information D1. If the estimated coordinate passed the range of the passage feature type, the estimated coordinate and orientation angle of the particle are reserved and the coordinate and orientation angle are adjusted according to the matching point coordinates and orientation angles of the passage feature type of the plurality of types of map feature information D1. (3) When the estimated coordinate of the particle is located in the range of the room feature type of the plurality of types of map feature information D1, the estimated coordinate is further analyzed and it is determined whether it is located near the range of the route feature type of the plurality of types of map feature information D1. If the estimated coordinate is located near to the range of the route feature type, the coordinate and orientation angle are adjusted to accord with the route and orientation angle of the route feature type. (4) When the estimated coordinate of the particle is located in the range of the room feature type of the plurality of types of map feature information D1, the estimated coordinate is further analyzed and it is determined whether it is located in the range of the obstacle feature type of the plurality of types of map feature information D1. If the estimated coordinate is located in the range of the obstacle feature type, the estimated coordinate is eliminated. If the estimated coordinate is not located in the range of the obstacle feature type, the estimated coordinate is reserved.

Then, the best estimated positioning result is measured for obtaining the positioning coordinate S3 according to the weighted values of all particles. In the embodiment, the method of measuring the best estimated positioning result is the Bayesian Theorem method. The Bayesian Theorem is the base of the development of most dynamic estimation algorithms. The Bayesian Theorem is described simply as follows: generally speaking, in a dynamic tracking system, the distribution density function of system model $P(x_k|x_{k-1}, z_{1:k-1})$ and the distribution density function of the assistant observation model $P(z_k|x_k)$ can be expressed as the functions:

$$x_k = f_k(x_{k-1}, w_k)$$

$$z_k = h_k(x_k, v_k)$$

The above function $x_k$ is the state vector at the time point k, $w_k \in R^{n_x}$ is the system noise, $z_k \in R^{n_z}$ is the assistant observation value, $v_k \in R^{n_v}$ is the observation noise, and $f_k: R^{n_x} \times R^{n_w} \to R^{n_x}$, $h_k: R^{n_x} \times R^{n_v} \to R^{n_z}$ are the nonlinear functions of the state vector and the assistant observation value, respectively.

Specifically, the particles filter (PF) method is based on the Monte Carlo method. The particles are used to express that the probability can be applied in any type of state space models. Selecting the random state particles through the posterior probability to present the distribution can be referred to as Sequential Importance Sampling. Therefore, the particles filter method is the process of approximating the probability density function by finding a group of random samples communicated in the state space, while using a sample average value to replace the integral operation for obtaining the minimum variance distribution of the state. The sample is a particle. When the numbers of samples N approximate ∞, the distribution of the particles may approximate any type of probability density distribution Therefore, the particles filter (PF) method provides an optimized estimated state value and variance by using the weighting particles as the likelihood density function and using the observed value to update the weighted value of particles.

In an embodiment of the disclosure, the inertial detect module 112, the movement estimation module 114, the map data storage module 116 and the matching module 118 of the positioning device 110 may be integrated in a matching map device (not present).

Figure 2A:
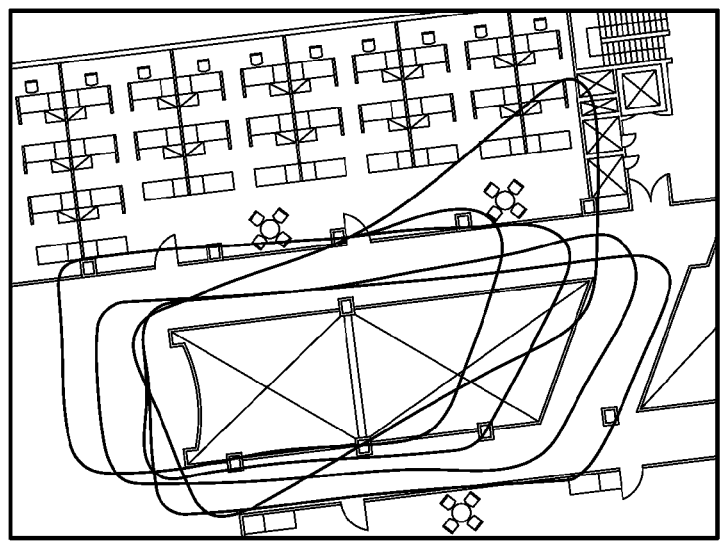
FIG. 2A is schematic diagram illustrating the routing of a user which does not process map matching according to an embodiment of the disclosure.
Figure 2B:
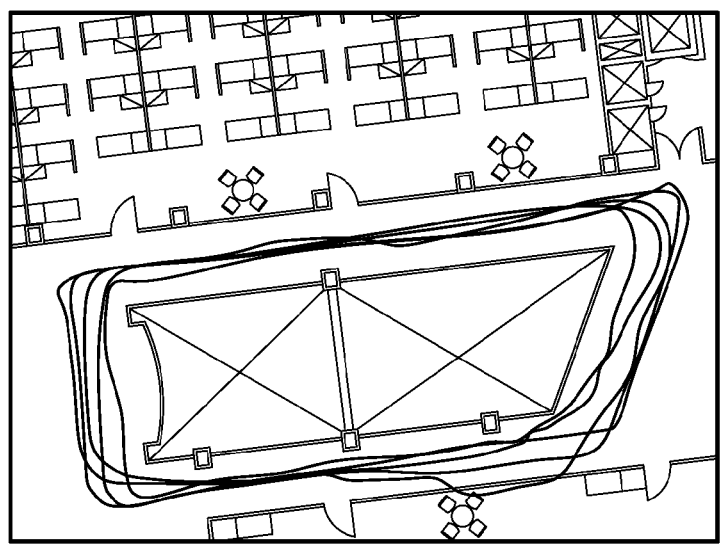
FIG. 2B is schematic diagram illustrating the routing of a user which has been processed map matching according to an embodiment of the disclosure.

FIG. 2A is schematic diagram illustrating the routing of a user which does not process map matching according to an embodiment of the disclosure. FIG. 2B is schematic diagram illustrating the routing of a user which has been processed map matching according to an embodiment of the disclosure. In FIG. 2A, when the user walks 5 in a loop in a plane, because of the drift factor of the positioning device 110, an error of the positioning result occurs. However, in FIG. 2B, the positioning result is more precise than in FIG. 2A, after the map matching method described in the embodiments of the disclosure is performed.

Figure 3:
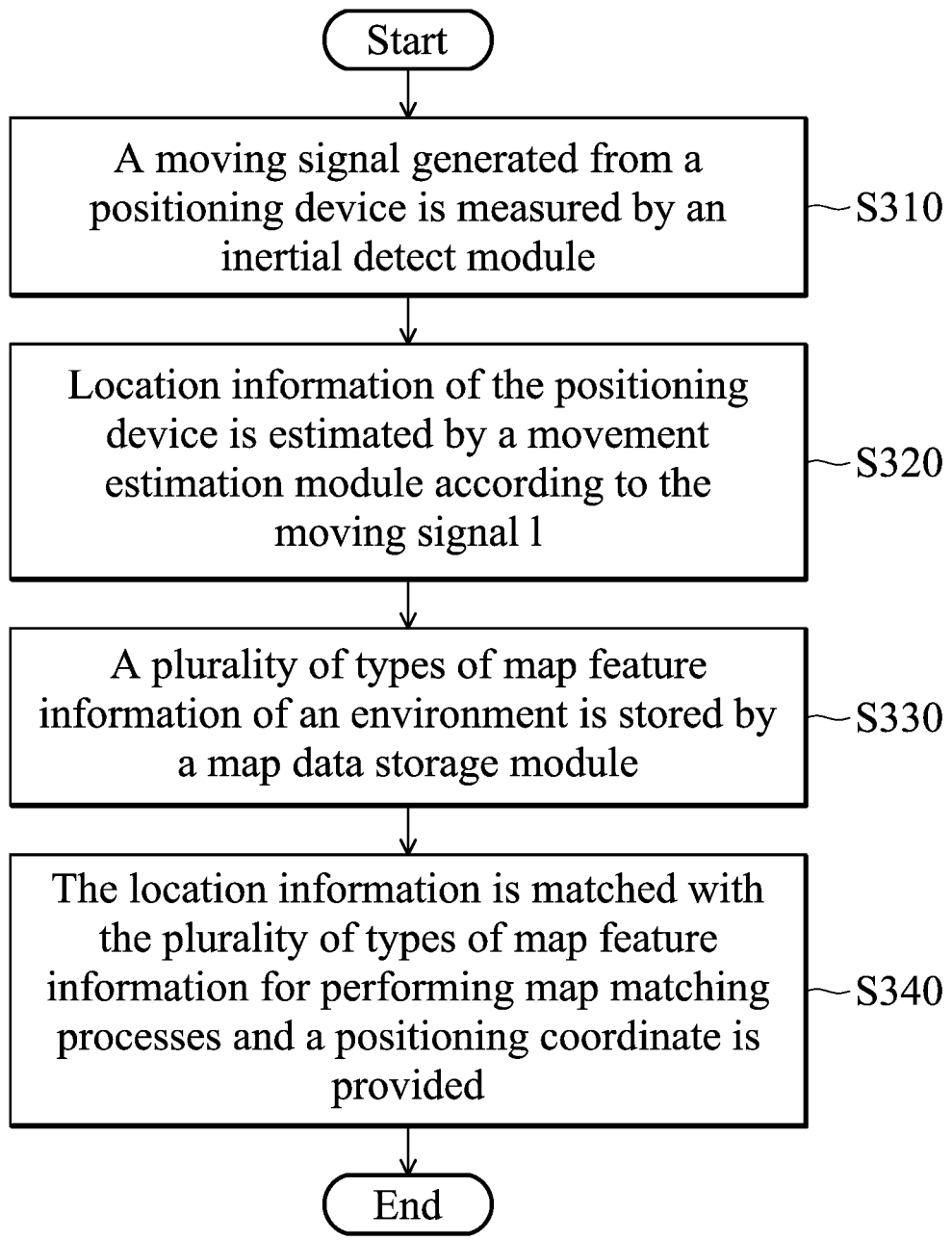
FIG. 3 is a flowchart of a map matching method according to an embodiment of the disclosure.

FIG. 3 is a flowchart of a map matching method according to an embodiment of the disclosure. In step S310, a moving signal generated from a positioning device is measured by an inertial detect module. In step S320, location information of the positioning device is estimated by a movement estimation module according to the moving signal. In step S330, a plurality of types of map feature information of an environment is stored by a map data storage module. In step S340, the location information is matched with the plurality of types of map feature information for performing map matching processes and a positioning coordinate is provided. In an embodiment of the disclosure, in step 340, the matching module matches the location information with the plurality of types of map feature information for performing map matching processes by adjusting a weighted value corresponding to the location information according to a matching result generated by matching the location information with the plurality of types of map feature information.

Figure 4A:
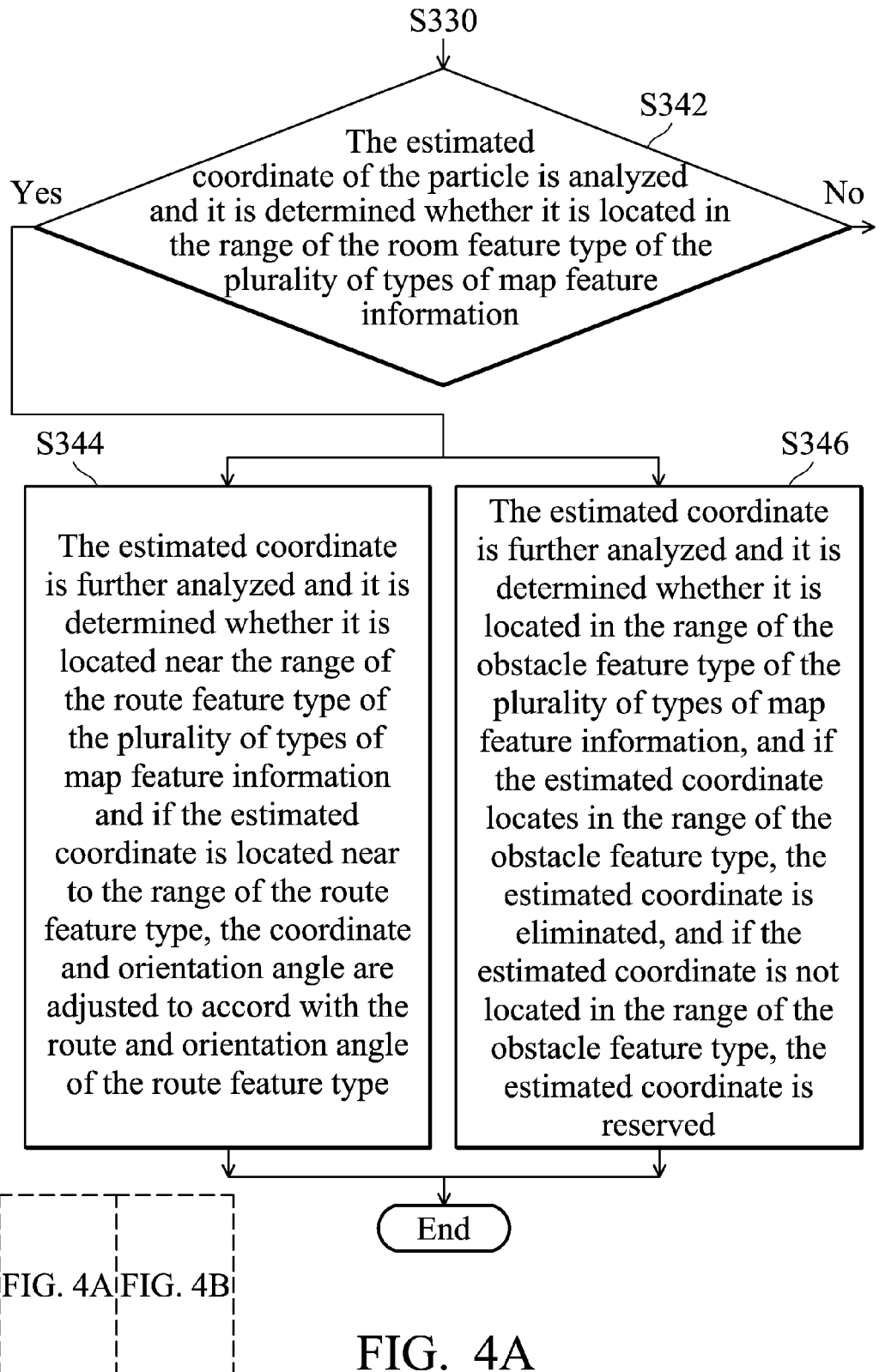
FIG. 4A-4B is a flowchart of the step S340 of FIG. 3 according to an embodiment of the disclosure.
Figure 4B:
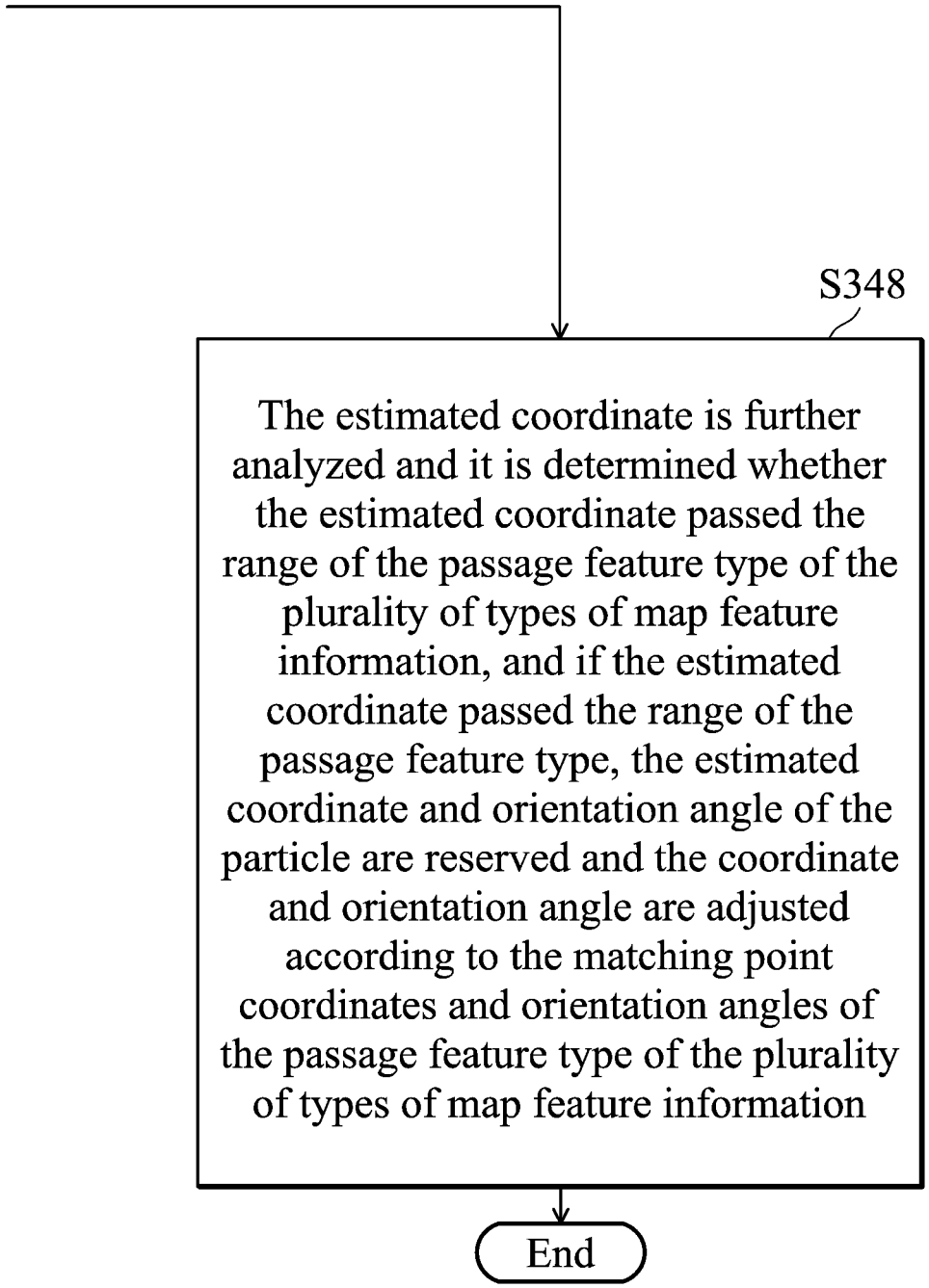

FIG. 4A-4B is a flowchart of the step S340 of FIG. 3 according to an embodiment of the disclosure. In an embodiment of the disclosure, the step S340 comprises the step S342, step S344, step S346 and step S348. In step S342, the estimated coordinate of the particle is analyzed and it is determined whether it is located in the range of the room feature type of the plurality of types of map feature information. If the estimated coordinate of the particle is located in the range of the room feature type of the plurality of types of map feature information, step S344 and step S346 are processed. In step S344, the estimated coordinate is further analyzed and it is determined whether it is located near the range of the route feature type of the plurality of types of map feature information and if the estimated coordinate is located near to the range of the route feature type, the coordinate and orientation angle are adjusted to accord with the route and orientation angle of the route feature type. In step S346, the estimated coordinate is further analyzed and it is determined whether it is located in the range of the obstacle feature type of the plurality of types of map feature information, and if the estimated coordinate locates in the range of the obstacle feature type, the estimated coordinate is eliminated, and if the estimated coordinate is not located in the range of the obstacle feature type, the estimated coordinate is reserved. If the estimated coordinate of the particle is located on the outside of the range of the room feature type of the plurality of types of map feature information, the step S348 is processed. In the step S348, the estimated coordinate is further analyzed and it is determined whether the estimated coordinate passed the range of the passage feature type of the plurality of types of map feature information, and if the estimated coordinate passed the range of the passage feature type, the estimated coordinate and orientation angle of the particle are reserved and the coordinate and orientation angle are adjusted according to the matching point coordinates and orientation angles of the passage feature type of the plurality of types of map feature information.

Traditional indoor automatic positioning technology of pedestrians used to detect the moving signal for estimating the position by an inertial detect device carried by the pedestrian may generate an error as time goes by caused by the drift of the inertial detect device, thus causing the limitation of available usage time and stability of a system. Therefore, the method may be applied to tracking the target in the positioning technology of a pedestrian for improving the result of positioning and promoting the accuracy by measuring the probability density according to the plurality of types of map feature information.

The above paragraphs describe many aspects of the disclosure. Obviously, the teaching of the disclosure can be accomplished by many methods, and any specific configurations or functions in the disclosed embodiments only present a representative condition. Those who are skilled in this technology can understand that all of the disclosed aspects in the disclosure can be applied independently or be incorporated.

While the disclosure has been described by way of example and in terms of preferred embodiment, it is to be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A map matching device for a positioning device, comprising:
an inertial detect module, measuring a moving signal generated from the positioning device;
a movement estimation module, estimating location information of the positioning device according to the moving signal;
a map data storage module, storing information of an environment where the positioning device is located; and
a matching module, progressing a particles initialization process for the location information by a particles filter, adding white noise into the location information by a Gaussian distribution method for measuring the distribution of each particle at a next time interval, matching the location information with the information of the environment for performing map matching processes, and providing a positioning coordinate, wherein the positioning device classifies and sets the environment where a user of the positioning device walks to generate the information of the environment in advance according to a plurality of types of map feature information wherein the matching module analyzes an estimated coordinate of a particle and determines whether the estimated coordinate is located in the range of a room feature type of the plurality of types of map feature information, wherein if the estimated coordinate of the particle is located in the range of the room feature type of the plurality of types of map feature information, the matching module maintains an original weighted value to reserve the estimated coordinate of the particle, and if the estimated coordinate of the particle is located on the outside of the range of the room feature type of the plurality of types of map feature information, the matching module analyzes the estimated coordinate and determines whether the estimated coordinate passed the range of a passage feature type of the plurality of types of map feature information, wherein the plurality of types of map feature information comprises; the room feature type, recorded by a polygon geometry and configured to determine area ranges of enclosed spaces; the passage feature type, recorded by a line geometry and configured to determine entrances/exits between the area ranges of the enclosed spaces and determine matching point coordinates and orientation angles of the entrances/exits; a route feature type, recorded by the line geometry and configured to determine a location of a route and orientation angles of the route in a passable area range; and an obstacle feature type, recorded by the polygon geometry and configured to determine obstacle area ranges of the obstacles.

2. The device of claim 1, wherein the moving signal comprises acceleration and angular velocity of the positioning device.

3. The device of claim 1, wherein the plurality of types of map feature information comprise a plurality of geometry shape information and coordinate information.

4. The device of claim 1, wherein the matching module matches the location information with the information of the environment for performing map matching processes by adjusting a weighted value corresponding to the location information according to a matching result generated by matching the location information with the information of the environment.

5. A map matching method, comprising:
measuring a moving signal generated from a positioning device by an inertial detect module;
estimating location information of the positioning device according to the moving signal by a movement estimation module;
classifying and setting an environment where a user of the positioning device walks to generate information of the environment according to a plurality of types of map feature information;
storing the information of the environment by a map data storage module; progressing a particles initialization process for the location information by a particles filter;
adding white noise into the location information by a Gaussian distribution method for measuring the distribution of each particle at a next time interval; and
matching the location information with the information of the environment for performing map matching processes, and providing a positioning coordinate by a matching module wherein in the step of matching the location information with the information of the environment, further comprising the steps of: analyzing an estimated coordinate of a particle and determining whether the estimated coordinate is located in the range of a room feature type of the plurality of types of map feature information, wherein if the estimated coordinate of the particle is located in the range of the room feature type of the plurality of types of map feature information, maintaining an original weighted value to reserve the estimated coordinate of the particle, and if the estimated coordinate of the particle is located on the outside of the range of the room feature type of the plurality of types of map feature information, analyzing the estimated coordinate and determining whether the estimated coordinate passed the range of a passage feature type of the plurality of types of map feature information;

wherein the plurality of types of map feature information comprises: the room feature type, recorded by a polygon geometry and configured to determine area ranges of enclosed spaces; the passage feature type, recorded by a line geometry and configured to determine entrances/exits between the area ranges of enclosed spaces and determine the matching point coordinates and orientation angles of the entrances/exits; a route feature type, recorded by the line geometry and configured to determine a location of a route and orientation angles of the route in a passable area range; and an obstacle feature type, recorded by the polygon geometry and configured to determine obstacle area ranges of the obstacles.

6. The method of claim 5, wherein the moving signal comprises acceleration and angular velocity of the positioning device.

7. The method of claim 5, wherein the plurality of types of map feature information comprise a plurality of geometry shape information and coordinate information.

8. The method of claim 5, wherein the matching module matches the location information with the information of the environment for performing map matching processes by adjusting a weighted value corresponding to the location information according to a matching result generated by matching the location information with the information of the environment.

9. A map matching system, comprising:
a positioning device, wherein the positioning device comprises an inertial detect module, measuring a moving signal generated from the positioning device;
a movement estimation module, estimating location information of the positioning device according to the moving signal;
a map data storage module, storing information of an environment where the positioning device is located; and
a matching module, progressing a particles initialization process for the location information by a particles filter, adding white noise into the location information by a Gaussian distribution method for measuring the distribution of each particle at a next time interval, matching the location information with the information of the environment for performing map matching processes, and providing a positioning coordinate; and
a display device, receiving the positioning coordinate and displaying a location of the positioning device, wherein the positioning device classifies and sets the environment where a user of the positioning device walks to generate the information of the environment in advance according to a plurality of types of map feature information wherein the matching module analyzes an estimated coordinate of a particle and determines whether the estimated coordinate is located in the range of a room feature type of the plurality of types of map feature information, wherein if the estimated coordinate of the particle is located in the range of the room feature type of the plurality of types of map feature information, the matching module maintains the original weighted value to reserve the estimated coordinate of the particle, and if the estimated coordinate of the particle is located on the outside of the range of the room feature type of the plurality of types of map feature information, the matching module analyzes the estimated coordinate and determines whether the estimated coordinate passed the range of a passage feature type of the plurality of types of map feature information, wherein the plurality of types of map feature information comprises: the room feature type, recorded by a polygon geometry and configured to determine area ranges of enclosed spaces; the passage feature type, recorded by a line geometry and configured to determine entrances/exits between the area ranges of the enclosed spaces and determine matching point coordinates and orientation angles of the entrances/exits; a route feature type, recorded by the line geometry and configured to determine a location of a route and orientation angles of the route in a passable area range; and an obstacle feature type, recorded by the polygon geometry and configured to determine obstacle area ranges of the obstacles.

10. The system of claim 9, wherein the moving signal comprises acceleration and angular velocity of the positioning device.

11. The system of claim 9, wherein the plurality of types of map feature information comprises a plurality of geometry shape information and coordinate information.

12. The system of claim 9, wherein the matching module matches the location information with the information of the environment for performing map matching processes by adjusting a weighted value corresponding to the location information according to a matching result generated by matching the location information with the information of the environment.

13. The device of claim 1, wherein if the estimated coordinate passed the range of the passage feature type, the matching module reserves the estimated coordinate and an orientation angle of the particle and adjusts the estimated coordinate and the orientation angle according to matching point coordinates and orientation angles of the passage feature type of the plurality of types of map feature information.

14. The device of claim 1, wherein when the estimated coordinate of the particle is located in the range of the room feature type of the plurality of types of map feature information, the matching module further analyzes the estimated coordinate analyzed and determines whether the estimated coordinate is located near the range of a route feature type of the plurality of types of map feature information, wherein if the estimated coordinate is located near to the range of the route feature type, the matching module adjusts the estimated coordinate and orientation angle of the particle to accord with route and orientation angle of the route feature type.

15. The device of claim 1, wherein when the estimated coordinate of the particle is located in the range of the room feature type of the plurality of types of map feature information, the matching module further analyzes the estimated coordinate and determines whether the estimated coordinate is located in the range of an obstacle feature type of the plurality of types of map feature information, wherein if the estimated coordinate is located in the range of the obstacle feature type, the matching module eliminates the estimated coordinate.

16. The method of claim 5, wherein if the estimated coordinate passed the range of the passage feature type, the estimated coordinate and an orientation angle of the particle are reserved and the coordinate and the orientation angle are adjusted according to matching point coordinates and orientation angles of the passage feature type of the plurality of types of map feature information.

17. The method of claim 5, wherein when the estimated coordinate of the particle is located in the range of the room feature type of the plurality of types of map feature information, the estimated coordinate is further analyzed and determined whether the estimated coordinate is located near the range of a route feature type of the plurality of types of map feature information, wherein if the estimated coordinate is located near to the range of the route feature type, the estimated coordinate and an orientation angle of the particle are adjusted to accord with the route and orientation angle of the route feature type.

18. The method of claim 5, wherein when the estimated coordinate of the particle is located in the range of the room feature type of the plurality of types of map feature information, the estimated coordinate is further analyzed and determined whether the estimated coordinate is located in the range of an obstacle feature type of the plurality of types of map feature information, wherein if the estimated coordinate is located in the range of the obstacle feature type, the estimated coordinate is eliminated.

19. The system of claim 9, wherein if the estimated coordinate passed the range of the passage feature type, the matching module reserves the estimated coordinate and an orientation angle of the particle and adjusts the estimated coordinate and the orientation angle according to matching point coordinates and orientation angles of the passage feature type of the plurality of types of map feature information.

20. The system of claim 9, wherein when the estimated coordinate of the particle is located in the range of the room feature type of the plurality of types of map feature information, the matching module further analyzes the estimated coordinate analyzed and determines whether the estimated coordinate is located near the range of a route feature type of the plurality of types of map feature information, wherein if the estimated coordinate is located near to the range of the route feature type, the matching module adjusts the estimated coordinate and orientation angle of the particle to accord with route and orientation angle of the route feature type.

21. The system of claim 9, wherein when the estimated coordinate of the particle is located in the range of the room feature type of the plurality of types of map feature information, the matching module further analyzes the estimated coordinate and determines whether the estimated coordinate is located in the range of an obstacle feature type of the plurality of types of map feature information, wherein if the estimated coordinate is located in the range of the obstacle feature type, the matching module eliminates the estimated coordinate.

* * * * *